United States Patent [19]

Janniello

[11] 4,346,419

[45] Aug. 24, 1982

[54] DETACHABLE PLUG

[75] Inventor: Frank Janniello, Stamford, Conn.

[73] Assignee: Clairol Incorporated, New York, N.Y.

[21] Appl. No.: 258,062

[22] Filed: Apr. 27, 1981

[51] Int. Cl.³ .......................................... H02H 11/00

[52] U.S. Cl. ...................................... 361/2; 200/51.09; 307/252 B; 307/252 N; 307/112; 339/147 R; 361/100

[58] Field of Search ...................... 361/1, 2, 3, 58, 100, 361/101; 307/112, 125, 126, 139, 140, 143, 149, 150, 326, 328, 252 B, 252 N, 252 T; 339/111, 147 R, 147 C, 147 P; 200/51.09

[56] References Cited

U.S. PATENT DOCUMENTS 3,549,990 12/1970 Hochheiser ......................... 361/2 X
4,245,270 1/1981 Busby .................................... 361/58

FOREIGN PATENT DOCUMENTS 2542400 3/1977 Fed. Rep. of Germany ...... 339/111
1119671 6/1956 France .............................. 200/51.09
1343143 10/1963 France .............................. 200/51.09

OTHER PUBLICATIONS

"Commutated Relay Combines Solid-State Switching-"-von Brimer, Thirteenth Annual National Relay Conference, Oklahoma State University, 4/27-29/1965.

*Primary Examiner*—Harry E. Moose, Jr.
*Attorney, Agent, or Firm*—Isaac Jarkovsky; John J. Balser; Gerald S. Rosen

[57] ABSTRACT

There is disclosed an electrical connector system for a device powered by high current comprising a plug with two high current female contacts and one low current female contact, a socket in the device having two high current male contacts and one low current male contact. The high current contacts are longer than the low current contact so that when the plug is inserted, the high current contacts make connection before the low current contact and when the plug is removed the low current contact is disconnected first, breaking the circuit and preventing arcing. The high current contacts in the socket are electrically connected to the electrical device by a solid-state switch wherein the control gate is operated by the low current contact.

2 Claims, 2 Drawing Figures

DETACHABLE PLUG

BACKGROUND

This invention relates to a system for preventing arcing between female contacts of an electric plug and male contacts of an electrically operated device requiring high current.

The plug is a female member containing two high current contacts and one low current contact. The male receptacle has two high current prongs and one low current prong connected to a solid state switch via a gate control.

Arcing generally occurs between contacts of a plug and socket of an electric appliance when the plug is removed from the socket while the current is turned on. This arcing tends to burn the terminals and can be a fire hazard.

Thus, it is usually desirable and sometimes necessary to insure that the electric current to a two-part electrical connector is broken whenever the two parts of the connector are disengaged from each other. There are a number of ways in which an interlock involving the connector can be provided to achieve such disengagement. For example, the connector may be provided with mating plug and socket elements in addition to those required to establish the desired electrical current through the connector. A break in the engagement between the additional plug and socket elements is used to indicate the disengagement of the connector parts carrying the current. Also, a microswitch may be mounted on a connector to respond to mechanical disengagement of the parts of the connector. In either of the above cases, there are practical problems of insuring that the supply of electricity to the connector is broken without undue delay. Avoiding undue delay in operation of the interlock is important, particularly in the case of high voltages, otherwise arcing may occur within the connector during disengagement.

McDonald, et al. U.S. Pat. No. 4,044,208, issued Aug. 23, 1977 disclose a two-part electrical connector wherein the two parts are engageable in a mating relationship to establish electrical interconnection through the connector. An electrical conductor element is carried by one of the two parts and two electrical contact elements are mounted with the other of the two parts to abut the said conductor element so the two contact elements are thereby bridged electrically by the conductor element when the parts are in mating relationship. The electrical connector has an electrically conductive ring on the male portion which contacts two pins on opposite sides of the female socket to complete a circuit and activate an interlock switch. The contact does not occur until the two major contacts are made and, conversely, is broken prior to full disconnection of the male and female parts. McDonald, et al. disclose use of the connector and interlock in the supply of extra-high tension to a cathode ray tube.

The above described interlocks and connectors are, in general, costly.

There are no two-part electrical connector and interlocks disclosed which utilize a female plug, a male socket and a solid-state switch with a gate drive wherein the configuration of the contacts on the plug causes the removal of the gate drive before removal of power from the high current contacts when the alternating current cord is removed.

It is an object of this invention to provide a structurally simple, economical to operate, connector interlock system which prevents arcing.

It is another object of this invention to provide a two-part connector-interlock system comprising a male socket, female plug and solid-state switch.

BRIEF SUMMARY OF THE INVENTION

This invention provides a detachable AC cord interlock system which insures that substantially no arcing occurs when an electric powered device is connected to or disconnected from an electric power source by a plug. The interlock system is comprised of a male socket with two high current contact prongs of equal length and one low current contact prong shorter in length than the high current contact prongs and a female plug with matching contact receptacles for receiving the prongs. In the electric circuit connected to the contacts of the socket are an electric powered device, such as a heater, and a solid-state switch at the juncture of the low current circuit and the high current circuit. The solid-state switch has a control gate.

The contacts in the plug and socket are such that when the plug is inserted, power is applied to the high current contacts before it is supplied to the control gate via the low current contact, and when the plug is removed the control gate power is removed, shutting off the solid-state switch before the power is removed from the high current contacts.

DETAILED DESCRIPTION OF THIS INVENTION

Figure 1:
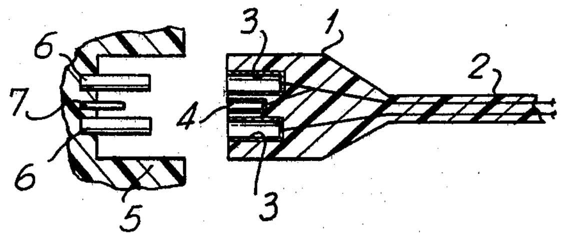
FIG. 1 is a side view in section of a female plug and male socket of this invention.
Figure 2:
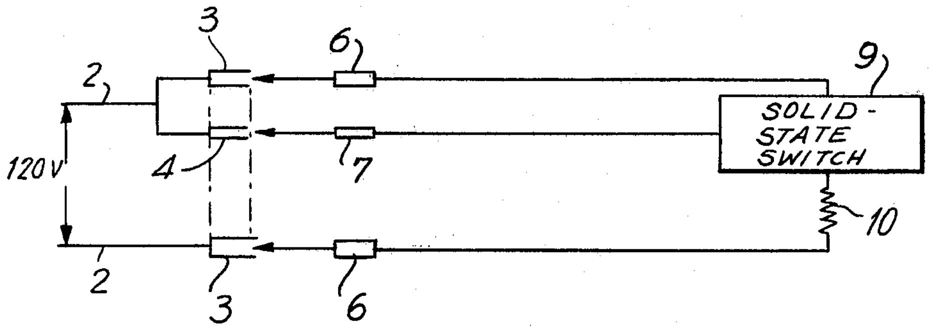
FIG. 2 is a schematic drawing of the electric circuit used in this invention.

Referring to FIGS. 1 and 2, the connector of this invention comprises a female plug 1 having therein two high current contact receptacles 3 and one low current contact receptacle 4. The receptacles 3 and 4 are electrically connected to a power cord 2 which draws electric power from an electrical main.

The male socket 5 which is in the electrically operated device (not shown) contains two male high current contact prongs 6 which are each the same length and which fit into the female high current contact receptacles 3 and make electrical contact therewith. Also, between the male high current contact prongs 6 is a male low current contact prong 7 shorter in length than the high current contact prongs 6. The low current contact prong 7 fits into the female low current contact receptacle 4.

The device which is powered by the electric current can be any number of types which require high current, e.g., electric drills, electric saws, irons, hair dryers, hair curling irons, hair stylers, heaters, hairsetters, and the like.

As can be seen in FIG. 2, when the plug 1 is inserted into the socket 5 the current received via power cord 2 from a power source, e.g., 120 volt main, passes from the plug contacts 3 and 4 to the respective contacts 6 and 7 via the socket 5 in the device being powered. The high current passes through the device (load) 10 and enters a solid-state switch 9. The low current passes through the control gate to turn the solid-state switch 9 on.

The lengths of the high current contacts 6 in the socket 5 and the low current contact 7 in the socket 5 are such that when the plug 1 is inserted into the socket 5, the high current contact is made before the low current contact is achieved, conversely, when the plug is removed, the low current contact is broken first, breaking the circuit to the gate control and turning the solid-state switch 9 off, preventing arcing.

I claim:

1. An electrical connection system for preventing arcing between the contacts comprising:

a socket having two high current male contacts and a low current male contact;

a plug having therein two high current female contacts and a low current female contact for receiving said male contacts;

said socket being part of an electrically powered device requiring high CURRENT:

said high current contacts in said socket being electrically connected to said device and a solid-state switch which is turned off and on by a control gate in electrical connection with said low current contact;

wherein the high current contacts in the socket and the plug are of such dimensions that they join before the low current contacts are joined when the plug is inserted into the socket in said device to be operated and the low current contacts are of such dimensions that their contact is broken before the contact of the high current contacts when the plug is removed thus preventing arcing.

2. The electrical connection system of claim 1 wherein the high current male contacts are of substantially equal length and are longer than the low current male contact and the corresponding female contacts are of sufficient lengths to receive said male contacts.

* * * * *